W. HARPER.
MEANS FOR USE IN INSTALLING TRANSMISSION BANDS FOR AUTOMOBILES.
APPLICATION FILED JUNE 27, 1919.

1,376,690.

Patented May 3, 1921.
2 SHEETS—SHEET 1.

WITNESSES
Howard D. Orr.
F. T. Chapman.

INVENTOR,
William Harper,
BY
E. G. Siggers
ATTORNEY

W. HARPER.
MEANS FOR USE IN INSTALLING TRANSMISSION BANDS FOR AUTOMOBILES.
APPLICATION FILED JUNE 27, 1919.
1,376,690.
Patented May 3, 1921.
2 SHEETS—SHEET 2.
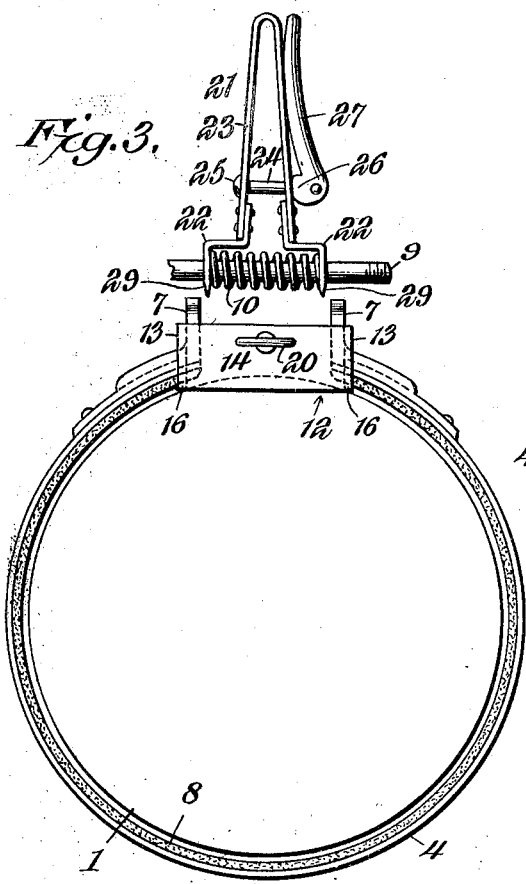
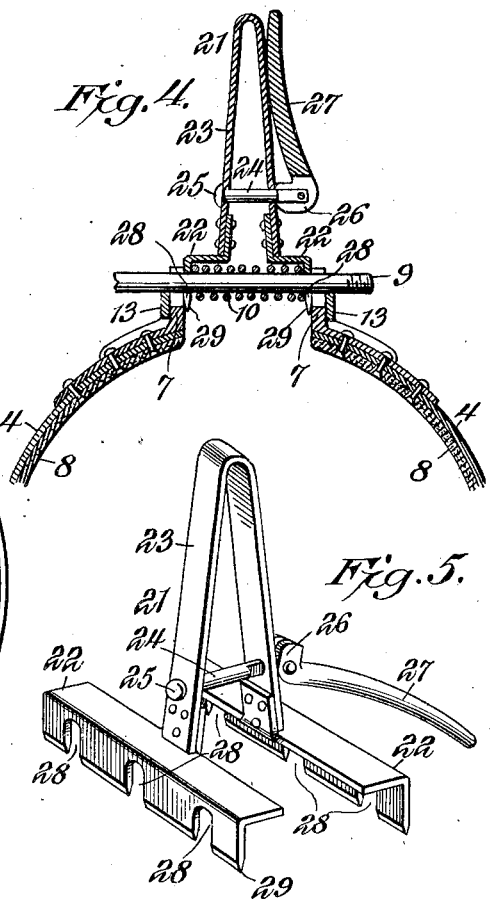
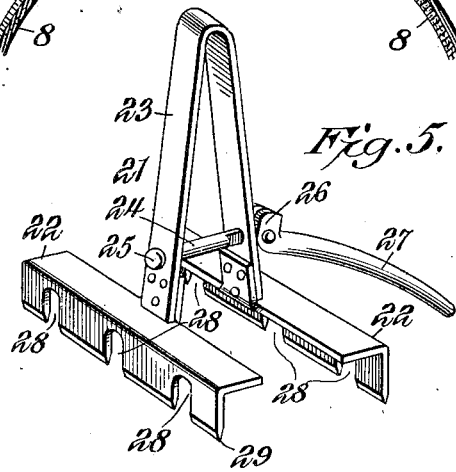
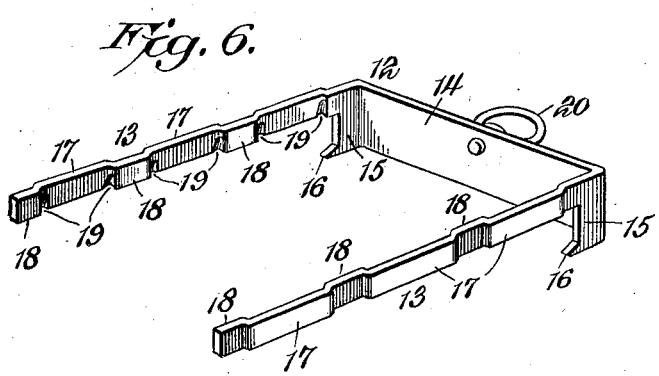
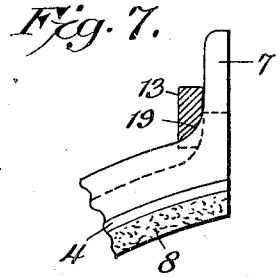
WITNESSES
William Harper, INVENTOR,
BY
ATTORNEY

UNITED STATES PATENT OFFICE.

WILLIAM HARPER, OF CAMPBELL, NEBRASKA.

MEANS FOR USE IN INSTALLING TRANSMISSION-BANDS FOR AUTOMOBILES.

1,376,690.     Specification of Letters Patent.     Patented May 3, 1921.

Application filed June 27, 1919. Serial No. 307,191.

*To all whom it may concern:*

Be it known that I, WILLIAM HARPER, a citizen of the United States, residing at Campbell, in the county of Franklin and State of Nebraska, have invented a new and useful Means for Use in Installing Transmission - Bands for Automobiles, of which the following is a specification.

This invention has reference to means for installing transmission bands of automobiles, and more particularly for the installation of the transmission bands of the type of automobile known commercially as the Ford automobile.

The installation of new transmission bands in the Ford automobile is a somewhat trying ordeal, particularly for those not specially skilled in the operation. After the bands have been suitably placed, the free ends must be drawn together in a manner permitting the application of the transmission cover with the pedal shafts and springs, and the holding of the bands in such position preparatory to the placing of the transmission cover is usually performed with wires or strings.

In order to expedite the drawing together and holding of the ends of the transmission bands to permit the application of the transmission cover, the invention provides two structures, one of which is designed to engage and hold the bands themselves in properly spaced relation at the adjacent ends, and the other of which is applied to the pedal shafts to temporarily hold the spreading springs of the bands in a suitably compressed condition to permit the seating of the transmission cover, after which the two devices of the invention are readily withdrawn.

The invention will be best understood from a consideration of the following detailed description, taken in connection with the accompanying drawings forming a part of this specification, with the understanding, however, that the invention is not confined to any strict conformity with the showing of the drawings, but may be changed or modified so long as such changes and modifications mark no material departure from the salient features of the invention as expressed in the appended claims.

In the drawings—

Fig. 3 is a rear elevation of a portion of the transmission with the invention applied;

Fig. 4 is a cross section of a portion of the structure shown in Fig. 3, but with the crank shaft seated;

Fig. 5 is a perspective view of the device of the invention designed for compressing the spread springs of the transmission bands;

Fig. 6 is a perspective view of a yoke structure constituting part of the invention, and designed to hold the adjacent ends of the transmission bands in suitably close relation;

Fig. 7 is a fragmentary detail view showing a small portion of the structure of Fig. 6 applied to one end of a transmission band.

Figure 1:
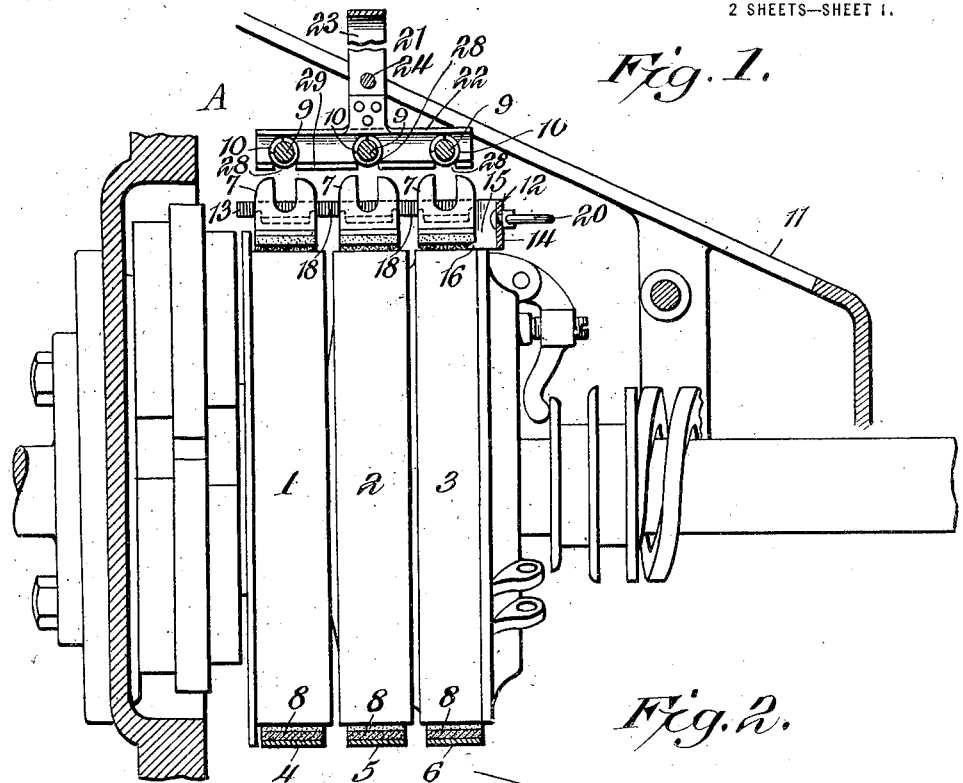
Figure 1 is a longitudinal section, with some parts in elevation and parts omitted, of the transmission of the Ford automobile, showing the invention applied.

Referring to the drawings, there is shown a transmission assembly A, with certain parts omitted as unnecessary to the understanding of the invention. The transmission assembly includes drums 1, 2, 3, forming respectively the reverse, low speed and brake drums of the transmission structure. These drums are, in the assembled machine, surrounded by respective bands 4, 5 and 6, customarily made of strips of more or less elastic sheet metal, with terminal lugs or ears 7 by means of which the bands are drawn tightly about the respective drums, and an interior lining 8 of some suitable braking material. Extending between the ears 7 of each band and through these ears, are rods or shafts 9 which, for the purposes of this description, may be taken as alike, although in practice they differ somewhat, and each rod or shaft 9 is under the control of a respective pedal, and may therefore be designated as pedal shaft, whereby an operator is enabled to cause the bands to contract in circumferential size and thus grip respective ones of the drums 1, 2 and 3.

In order to cause the bands to expand and thereby release the drums, each shaft or rod 9 is surrounded by a spring 10, bearing at the ends against the adjacent faces of the ears 7. The springs are held in engagement with the ears by the rods or shafts 9, serving as guides and supports, and these shafts are suitably mounted so that when placed in position they will hold the proper relation to the bands.

Since the general construction of the transmission to which the invention relates is well-known, it is deemed unnecessary to refer to various parts, except as needed in the description and especially in the description of the operation.

When the transmission is dismantled to the extent necessary to replace the transmission bands, the transmission cover, indicated at 11, is removed, thus permitting ready access to the transmission as a whole. In order to remove the cover, the bands are loosened up so that they may freely spread out as far as the springs 10 will force them. This relieves the parts of the pressure of the springs, and the transmission cover may then be lifted from the transmission case and placed to one side. The shafts or rods 9, with the springs 10, go with the transmission cover, so that they are no longer present in conjunction with the transmission bands.

Figure 2:
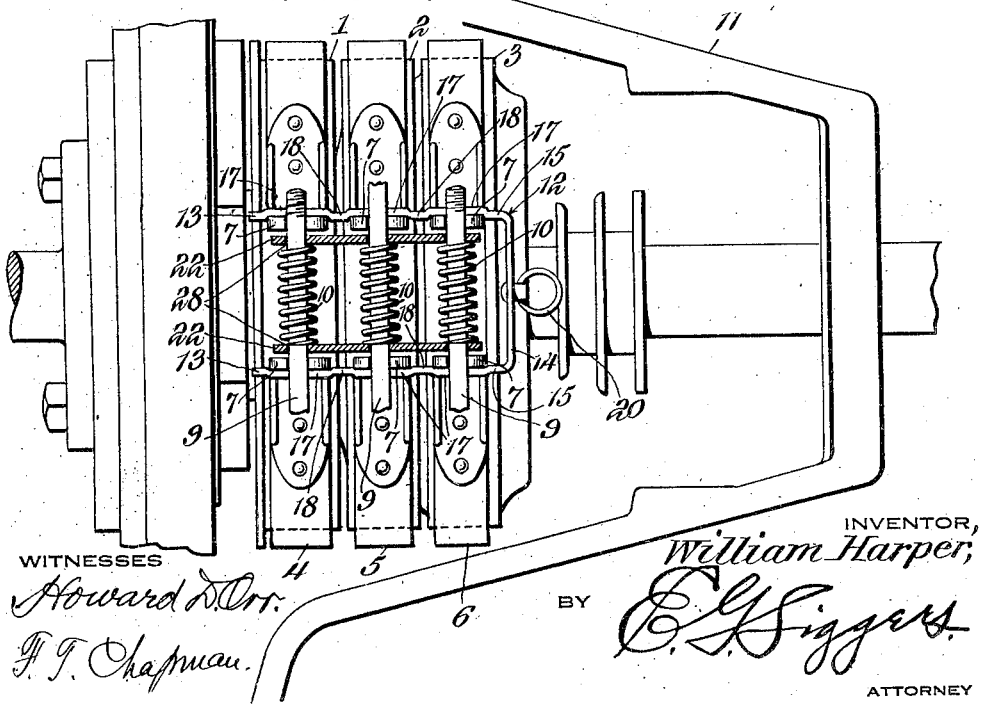
Fig. 2 is a plan view of the structure shown in Fig. 1 with some parts in horizontal section.

When a new set of bands has been installed in the usual manner, but before the bands are contracted, an implement 12, shown separately in Fig. 6, and applied in Figs. 1, 2, 3, 4 and 7, is placed about the ears 7 in such manner that these ears are drawn toward each other with the slots of the ears properly matching. The implement 12 comprises a three-sided yoke frame, opposite long sides 13 being connected together at one end by an end bar 14 somewhat broader than the side bars 13, which latter proceed from the end bar 14 near one long edge thereof. The end bar 14 therefore projects away from the side bars 13 for an appropriate distance, and terminates at each end in an inturned portion 15, ending in a tooth 16, projecting toward the distant end of the respective side bar 13. Each ear at each end of each transmission band 4, 5 and 6, is of partial channel shape, and the neighboring ears are spaced apart by a short distance to accommodate the side bars 13 and the ears 7, the bars 13 having outset portions 17 each of a length to span an ear 7. Between the outset portions 17, the sides 13 form shoulders 18 of a suitable length to engage between two adjacent ears on the same side of the transmission. Because of the channel shape of each ear 7, the side bars have short recesses 19 at opposite ends of each offset or projecting part 17 to accommodate the side flanges of the channels of the ears 7. In order to facilitate the manipulation of the yoke frame 12, the bar 14 is provided with a manipulating member 20, shown in the drawings as in the form of a ring.

There is also provided another implement 21, shown separately in Fig. 5, and applied in Figs. 1, 2, 3 and 4, the implement 21 being shown in Fig. 4 in horizontal section. The implement 21, which is in the nature of a clamp, is designed to grasp and compress the springs 10 on the rods or shafts 9, so that these springs may be shortened to a length less than the distance between the two ears 7 of a transmission band, thereby permitting the shafts 9 to be moved into the slots of the ears 7 with the springs between said ears. The clamp 21 comprises two opposed angle jaws 22, connected by a yoke-shaped handle 23 of sufficient elasticity to normally tend to separate the jaws enough to receive the springs 10 between them without the necessity of first compressing the springs. Traversing the members of the handle 23 is a pin 24, headed at one end 25 outside of the handle, and at the other end extending through the corresponding portion of the handle and there entering between and pivoted to the sides of a bifurcated cam-shaped end 26 on a lever 27 of the past center type. The construction is such that when the lever 27 is moved away from the handle 23, the members of the handle are released to their natural tendency to spread, the jaws 22 acting with them; but when the lever 27 is moved over toward the handle into engagement with the latter, the lever locks in the new position and at the same time forces the jaws 22 toward each other, thereby compressing the springs 10 to the desired extent.

Assuming that the transmission bands have been placed in proper position on the transmission drums, the implement 12, constituting a holding yoke frame for the bands, is applied to the ears 7 outside of the latter, bringing the bands into close but not necessarily tight relation to the drums, where these bands are held in position with the ears 7 sufficiently close to permit application of the transmission cover. Before the transmission cover is initially removed, a plate applied to an opening therein is first removed, such plate giving access to certain nuts on the rods or shafts 9, permitting the loosening of these nuts and the release of the springs 10 from working compression. The result is that the transmission bands are spread too far open to permit the replacing of the transmission cover, while the bands are in such condition. Also, the springs 10 are expanded too much. It is necessary, therefore, that the bands be drawn together and the springs be compressed before the transmission cover is replaced. The yoke frame 12 is employed for the purpose of compressing the transmission bands, while the clamp 21 compresses the springs. The yoke frame is so made that it may be applied to the transmission bands, and when the cover is replaced, the yoke frame 12 is readily accessible for removal through the transmission-cover opening.

Before the transmission cover is replaced, the clamp 21 is passed through the transmission-cover opening, and is applied to the rods 9 at opposite ends of the springs 10, the jaws 22 being spread. These jaws have a plurality of inwardly extending slots or recesses 28 so positioned as to receive the rods or shafts 9, and the edges of the jaws into which the slots 28 enter are beveled or sharpened as indicated at 29, to facilitate the application of the jaws to the springs, and ultimately the removal of the clamp 21 from the shafts or rods 9 without any sudden snapping open of the springs.

When the parts have been arranged with the transmission bands drawn together to a suitable extent, and the springs 10 compressed, the implement 21 being carried by the rods 9, in turn carried by the transmission cover, the latter is applied to the transmission case so that the springs 10 are located between the ears or lugs 7, and the transmission cover may be lowered into place without difficulty but not yet finally seated.

The engagement of the rods or shafts 9 with the top of the band-holding frame or member 12 provides complete seating of the transmission cover, but the rods 9 have entered into the slots in the ears or lugs 7 sufficiently to hold them in place and have the springs 10 move into end engagement with the inner faces of the lugs 7 when the spring-clamp 21 has been withdrawn. Moreover, before the holding member 12 is removed, the nuts or other devices applied to the rods 9 are screwed up the same as is the case when strings or wires are employed for a like purpose.

After the placing of the transmission cover has been partially completed, as described, the band-holding device 12 may be readily removed rearwardly through the open top of the transmission cover and the spring clamp 21 may readily be removed through the open top of the transmission cover by lifting it upwardly from the rods 9, the springs 10 expanding against the ears 7 and the latter spreading out until stopped by the usual nuts and other parts engaged by the ears 7. The teeth 16 are properly situated and shaped to engage under the brake band, thereby preventing the latter in its loose condition from being displaced with respect to the transmission drums, the several bands being spaced apart by the offset portions or projections 17.

The two implements 12 and 21 are designed for joint use, and both are needed in the replacement of transmission bands, one of the implements, namely, the implement 12, being designed as a holder for the transmission bands, compressing them to a desired extent, and preventing them from being displaced with reference to the transmission drums in a direction lengthwise of the transmission. The spring-compressor 21 is designed for association more particularly with the transmission cover, for holding the springs suitably contracted so as not to interfere with the initial and final placing of the transmission cover on the transmission case. Both implements are capable of removal through the transmission-cover opening, normally closed by a suitable plate.

What is claimed is:—

1. Means for the purpose described, comprising a yoke frame with side legs spaced to receive between them and hold the transmission band lugs within the transmission casing in properly spaced relation on the transmission drums, and a clamp having jaws to embrace the ends of and compress the transmission band springs to an extent to permit the introduction of the springs between the lugs when the lugs are held by the yoke.

2. Means for the purpose described, comprising a yoke member having substantially parallel side legs and a connecting end, with the side legs having outward extensions each of a width to embrace a transmission band lug and with the outward extensions spaced apart by a distance corresponding to the normal spacing of the transmission bands in position, and the connecting member of the yoke being of greater width than the side members and extending to one side of the plane of the side members and there having teeth to engage under a neighboring transmission band.

3. Means for the purpose described, comprising a yoke having substantially parallel side members to hold the matching lugs of transmission bands between them, said yoke being of a width less than the width of the access passage or opening through the transmission cover, whereby to remove the yoke when the transmission cover is in place.

4. Means for the purpose described, comprising a yoke having substantially parallel side members to hold the matching lugs of transmission bands between them, said yoke being of a width less than the width of the access passage or opening through the transmission cover, whereby to remove the yoke when the transmission cover is in place, each leg of the yoke having outwardly extended portions with intervening spacing parts whereby to receive and lodge corresponding transmission band yokes.

5. Means for the purpose described, comprising a yoke having substantially parallel side members to hold the matching lugs of transmission bands between them, said yoke being of a width less than the width of the access passage or opening through the transmission cover, whereby to remove the yoke when the transmission cover is in place, each leg of the yoke having outwardly extended portions with intervening spacing parts whereby to receive and lodge corresponding transmission band yokes, and the connecting member of the yoke being of greater width than the sides of the yoke and projecting to one side thereof with the ends of the connecting member terminating in teeth directed toward the other end of the yoke to engage under and hold the adjacent transmission band.

6. Means for the purpose described, comprising a clamp with opposed yieldable jaws, a handle joining said jaws, said handle constituting means to impart to the jaws a normal tendency to separate, the jaws having spaced recesses to receive the pedal rods or shafts of a transmission with the transmission band springs thereon, whereby to compress the springs, and means on the clamp for locking it with the springs compressed.

7. Means for the purpose described, comprising a clamp with opposed angle jaws having the extremities of the jaws in substantial parallelism with each other and provided with spaced recesses to receive the pedal shafts or rods of the transmission and the transmission band springs thereon, a resilient handle joining the jaws and normally spreading the same apart, and a lock cam lever on the jaws of the clamp for causing the approach of the jaws to compress the springs.

8. Means for the purpose described, comprising a clamp with opposed angle jaws, having the extremities of the jaws in substantial parallelism to each other and provided with spaced recesses to receive the pedal shafts or rods of the transmission and the transmission band springs thereon, and a lock cam lever on the clamp for causing the approach of the jaws to compress the springs, the clamp having an elastically yieldable handle of a length and size to project through the access opening in the transmission cover, and the cam lever being carried by the handle portion of the clamp to also project through the access opening in the transmission cover.

In testimony that I claim the foregoing as my own, I have hereto affixed my signature.

WILLIAM HARPER.

Witness:
A. L'HEUREUX.